(12) United States Patent
Shimizu (10) Patent No.: US 9,308,779 B2
(45) Date of Patent: *Apr. 12, 2016

(54) TIRE

(75) Inventor: Akiyoshi Shimizu, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 1274 days.

This patent is subject to a terminal disclaimer.

(21) Appl. No.: 13/000,993

(22) PCT Filed: May 27, 2009

(86) PCT No.: PCT/JP2009/059664
§ 371 (c)(1),
(2), (4) Date: Dec. 22, 2010

(87) PCT Pub. No.: WO2009/157268
PCT Pub. Date: Dec. 30, 2009

(65) Prior Publication Data
US 2011/0100520 A1    May 5, 2011

(30) Foreign Application Priority Data

Jun. 25, 2008  (JP) ................. 2008-166422

(51) Int. Cl.
*B60C 11/11*   (2006.01)
*B60C 11/03*   (2006.01)
*B60C 11/12*   (2006.01)

(52) U.S. Cl.
CPC .......... *B60C 11/0306* (2013.04); *B60C 11/11* (2013.01); *B60C 11/12* (2013.01);
(Continued)

(58) Field of Classification Search
CPC   B60C 11/0306; B60C 11/0309; B60C 11/11; B60C 11/12; B60C 2011/0346; B60C 2011/0348; B60C 2011/0353; B60C 2011/0365; B60C 2011/1209; B60C 2011/1213

USPC .......... 152/209.27, 209.28, 209.25, DIG. 3, 152/902, 209.18
IPC ....................................................... B60C 11/11
See application file for complete search history.

(56) References Cited

U.S. PATENT DOCUMENTS 6,000,450 A     12/1999  Kishimoto et al.
2003/0102064 A1*  6/2003  Below ................ 152/209.18

FOREIGN PATENT DOCUMENTS

EP    0 468 815 A1   1/1992
EP    1 428 688 A2   6/2004
(Continued)

OTHER PUBLICATIONS

Machine translation of JP 2007-153275 (no date).*
(Continued)

*Primary Examiner* — Justin Fischer
*Assistant Examiner* — Philip N Schwartz
(74) *Attorney, Agent, or Firm* — Sughrue Mion, PLLC (57) ABSTRACT

An object of the present invention is to provide a tire possessing improved partial wear resistance by optimizing shapes and dimensions of a block land portion and its position and arrangement. The tire has plural block land portion arrays 5 formed by a large number of block land portions 4 defined on a tread portion 1. Between two block land portion arrays 5 located adjacent to each other across the circumferential groove 2, the block land portions 4 constituting the block land portion arrays 5 are arranged on the tread portion 1 so as to be positionally displaced from each other in the circumferential direction of the tire; a groove 6 between the block land portions adjacent to each other in the width direction of the tire extends obliquely with respect to the width and circumferential directions of the tire. At this time, the distance $d_2$ between the block land portions adjacent to each other in the width direction of the tire is shorter than the distance $d_1$ between the block land portions adjacent to each other in the circumferential direction of the tire. Further, a length $d_3$ of the block land portion 4 in the circumferential direction of the tire falls within a range of 1.0 to 2.5% of a circumferential length of the tire.

7 Claims, 10 Drawing Sheets

(52) U.S. Cl.
CPC . *B60C2011/0346* (2013.04); *B60C 2011/0348* (2013.04); *B60C 2011/0353* (2013.04); *B60C 2011/0365* (2013.04)

(56) References Cited

FOREIGN PATENT DOCUMENTS

| | | | | |
|---|---|---|---|---|
| EP | 1 428 688 A3 | 8/2004 | | |
| JP | 3-136911 A | 6/1991 | | |
| JP | 5-319031 A | 12/1993 | | |
| JP | 6-171318 A | 6/1994 | | |
| JP | 7-290908 A | 11/1995 | | |
| JP | 9-136516 A | 5/1997 | | |
| JP | 2005-297880 A | 10/2005 | | |
| JP | 2007145209 A | * | 6/2007 | ............. B60C 11/11 |
| JP | 2007153275 A | * | 6/2007 | ............. B60C 11/12 |
| WO | 2008/146851 A1 | 12/2008 | | |

OTHER PUBLICATIONS

Machine translation of JP2007-145209 (no date).*

European Office Action, dated Feb. 28, 2013, issued in corresponding European Application No. 09769978.9.

European Search Report issued in European Application No. 09769978.9 dated May 13, 2011.

Japanese Office Action, dated May 7, 2013, issued in corresponding Japanese Patent Application No. 2010-517826.

Chinese Office Action, dated May 16, 2013, issued in corresponding Chinese Patent Application No. 200980128544.3.

Chinese Office Action issued in Chinese Application No. 200980128544.3 dated Jan. 14, 2013.

European Office Action issued in European Application No. 09769978.9 dated Dec. 4, 2013.

* cited by examiner

FIG. 14
PRIOR ART

TIRE

CROSS REFERENCE TO RELATED APPLICATIONS

This application is a National Stage of International Application No. PCT/JP2009/059664 filed May 27, 2009, claiming priority based on Japanese Patent Application No. 2008-166422 filed Jun. 25, 2008, the contents of all of which are incorporated herein by reference in their entirety.

TECHNICAL FIELD

The present invention relates to a tire having a tread portion provided with plural tire circumferential grooves extending in the circumferential direction of the tire and plural lateral grooves communicating two adjacent tire circumferential grooves to define plural block land portion arrays formed by a large number of block land portions, and in particular, to a tire for heavy load, which intends to improve wear resistance of the tire.

RELATED ART

In general, a tire for heavy load has a high aspect ratio and high belt rigidity so as to be able to bear enormously heavy load. Further, for travelling under various kinds of travelling conditions, most of the tires described above are provided with tread patterns formed by block land portions over the entire tread portion.

The tire for heavy load employing such a tread pattern has to bear heavier load than the load that a tire for a general vehicle bears, and hence, partial wear resulting from heel and toe wear at the time of travelling is likely to occur in proportion to the amount of load the tire has to bear. The heel and toe wear means such a wear that the block land portion excessively deforms when the tire is rotated under load, whereby the amount of wear is small at a leading (step-in) edge (portion that first comes into contact with the road surface), and the amount of wear is large at a trailing (kick-out) edge (portion that last comes into contact with the road surface) in the circumferential direction of the tire. This leads to a problem that there occurs a difference of wear mainly between both ends of the block land portions in the circumferential direction of the tire, causing decrease in the lifetime of the tire due to wear.

Conventionally, to prevent such a partial wear, various measures for suppressing the partial wear have been made. Of the measures, for example, Patent Document 1 discloses a method effective for preventing the partial wear caused by the falling deformation, in which a depth of lateral grooves defining a block is partially reduced, in other words, the lateral groove is provided with a bottom-raising portion, so as to increase stress against falling deformation of the block land portion in the circumferential direction of the tire, and to suppress the increase in the amount of driving force applied per unit area.

Patent Document 1: JP6171318A

DISCLOSURE OF THE INVENTION

Problems to be Solved By the Invention

Figure 1:
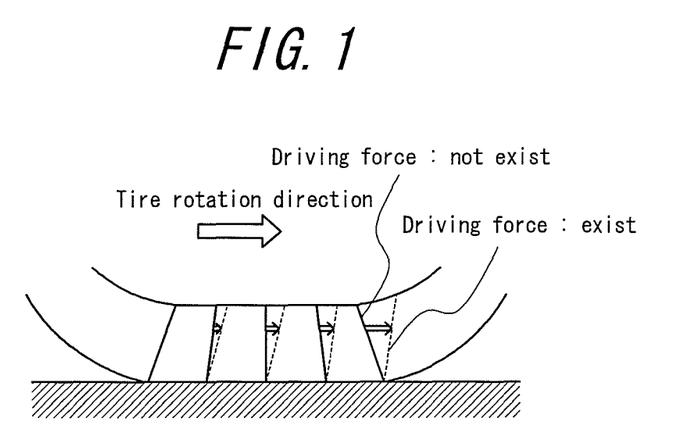
FIG. 1 is a diagram illustrating a relationship between the presence or absence of load by driving force and positions to which a tread portion moves.

A tire for heavy load mounted to a truck, bus or the like has a high aspect ratio and high belt rigidity. Therefore, at the time of tire rotation under load, difference in deformation between the belt portion and the tread portion occurs due to rotation at the belt portion by application of driving force, and wear at the tread portion that is in contact with a road surface, as shown in FIG. 1, whereby the tread portion excessively falls down to be deformed. This leads to increase in the amount of driving force per unit area that applied to the tread portion, so that slippage phenomenon with respect to the road surface occurs in the block land portion, and the amount of slip in the block land portion increases due to the slippage phenomenon. The tire described in Patent Document 1 provides a certain degree of effect for preventing the partial wear. However, it cannot sufficiently suppress the falling and deformation of the block land portion at the time of rotation of tire under load, and thus, it cannot suppress the increase in the amount of wear in the block land portion due to the slippage phenomenon, whereby the problem of wear resistance still remains. Further, in general, it would be possible to effectively suppress the amount of wear in the block land portion by increasing the rigidity of rubber constituting the block land portion to suppress the excessive falling and deformation of the block land portion. However, this excessively increases the rigidity in the block land portion, possibly causing the block land portion to be peeled off or damaged with cracks when the tire is rotated under load.

Therefore, an object of the present invention is to provide a tire possessing improved wear resistance while maintaining durability, by optimizing shapes and dimensions of a block land portion and its position and arrangement.

Means for Solving the Problem

To achieve the object above, the present invention provides a tire having a tread portion provided with a plurality of circumferential grooves extending in a circumferential direction of the tire and a plurality of lateral grooves communicating two adjacent circumferential grooves to demarcate a plurality of block land portion arrays formed by a large number of block land portions, in which, between the block land portion arrays adjacent to each other across the circumferential groove, the block land portions constituting the block land portion arrays are arranged so as to be positionally displaced from each other in the circumferential direction of the tire; a groove between the block land portions adjacent to each other in a width direction of the tire extends obliquely with respect to the width direction of the tire and to the circumferential direction of the tire; a distance between the block land portions adjacent to each other in the width direction of the tire is shorter than a distance between the block land portions adjacent to each other in the circumferential direction of the tire; and, a length of the block land portion in the circumferential direction of the tire falls within a range of 1.0 to 2.5% of a circumferential length of the tire. In this specification, the term "groove" represents a part of a circumferential groove and a groove extending between the block land portions adjacent to each other in the width direction of the tire; the expression "positionally displaced" represents arrangement in which pitches of beginning points of the respective block land portions adjacent in the width direction of the tire are arranged differently from each other, so that the circumferential end of one block land portion is not in the same position in the width direction as the circumferential end of the other block land portion adjacent to the one block land portion in the width direction of the tire.

Figure 2:
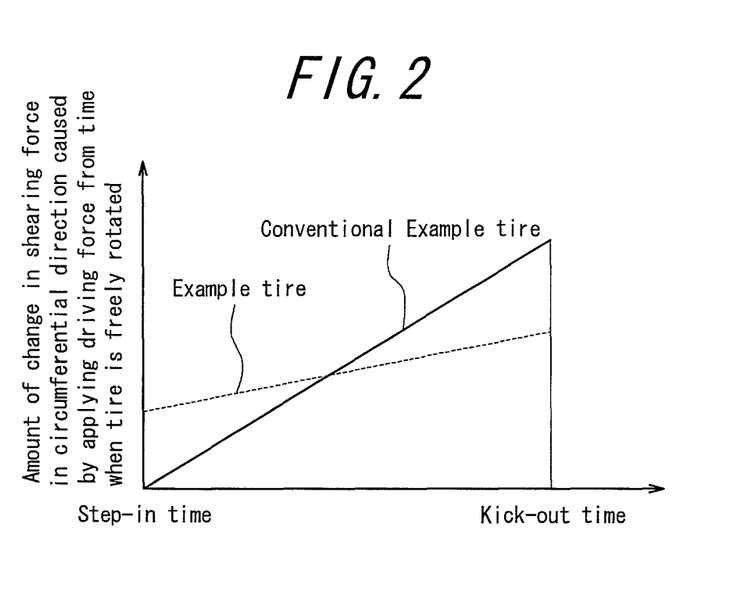
FIG. 2 is a diagram illustrating shearing force from a road surface when the driving force is applied.
Figure 3:
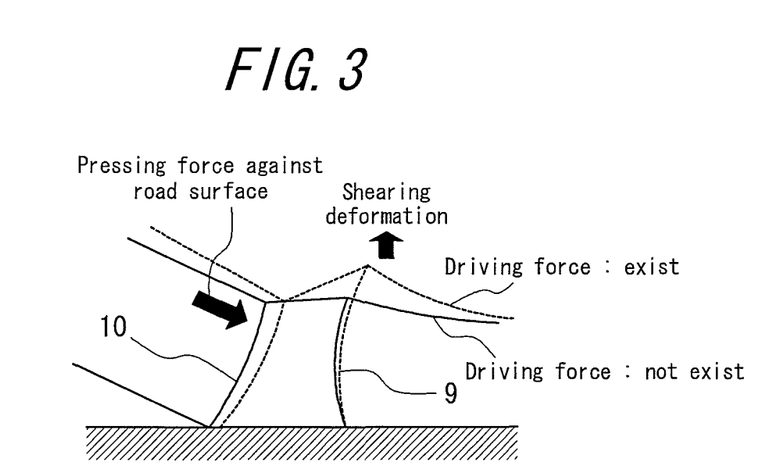
FIG. 3 is a diagram illustrating deformation of an adjacent block land portion when the driving force is applied.
Figure 4:
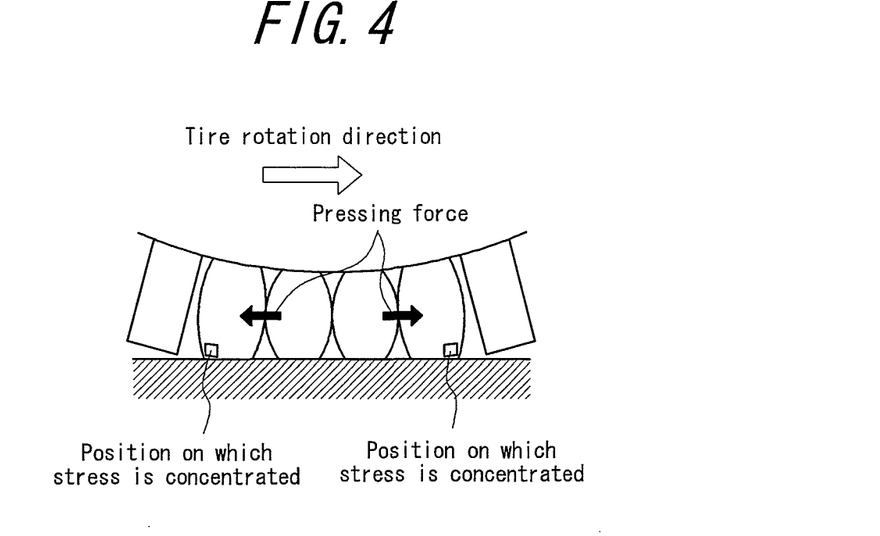
FIG. 4 is a diagram illustrating deformation of the block land portion when the block land portions adjacent to each other in the circumferential direction are too close to each other.

The present inventor found that the wear resistance deteriorates such that: an area of the tread surface that is brought into contact with the road surface decreases when the belt rigidity is increased, and as a result, shearing force excessively increases in the circumferential direction at the kick-out time when sliding wear occurs. FIG. 2 shows a change in the shearing force (force in the driving direction acting on the contacting surface of the tire) in the circumferential direction acting from the step-in ( )time to the kick-out time at a given position of the block land portion in a road-contacting state at a time when the driving force is applied, the change being plotted from the time when the driving force is not applied to the tire. As shown in the solid line, in the conventional tire, at the step-in time, the shearing force in the circumferential direction is almost equal to the shearing force at the time when driving force is not applied, and then, monotonously increases toward the kick-out time. The total amount (integral value of the shearing force in the circumferential direction generated from the step-in time to the kick-out time) of those forces generated from the step-in time to the kick-out time makes a vehicle accelerate, functioning as the force acting on a tire axis. If the contacting surface decreases, the decrease of the integral value resulting from the decrease in the area is compensated by sudden change in the force per unit area from the step-in time to the kick-out time. As a result, the shearing force in the circumferential direction increases at the kick-out time, which reduces the wear resistance. The present inventor made a keen study on the basis of an idea that the integral value above can be compensated by generating the shearing force (change from the time when driving force is not applied) in the circumferential direction from the step-in time to decrease the shearing force in the circumferential direction at the kick-out time, as shown in the dashed line in FIG. 2. As a result, it is found that the characteristic shown in the dashed line in FIG. 2 can be obtained by efficiently generating the force at the step-in time such that: as shown in FIG. 3, at the time when the driving force is applied, the shearing force is generated at a block land portion that has already been stepped in, causing the block land portion to deform; as deformation by the shearing force increases, the block land portion rises, accordingly, causing reaction at the next block land portion; the next block land portion is pressed on the road surface side, and the deformation of the next block land portion increases; whereby the force at the step-in time is efficiently generated. Although it is also found that this phenomenon effectively works by reducing a distance between the block land portions in the circumferential direction of the tire, the block land portions come into contact with each other at the time when the tire is brought into contact with the road surface in a case where the distance between the block land portions in the circumferential direction of the tire is too short, as illustrated in FIG. 4. This causes force to be generated in a direction same as the driving force at the kick-out time, which deteriorates the wear resistance. The present inventor investigated the configuration that can effectively utilize the action between the block land portions while eliminating the effect caused by the contact between the block land portions in the circumferential direction of the tire, and as a result, found the configuration of the present invention. According to the configuration of the present invention, the tire is configured such that: between two block land portion arrays adjacent to each other in the width direction of the tire, the block land portions constituting the block land portion arrays are arranged so as to be positionally displaced from each other in the circumferential direction of the tire; the groove between block land portions adjacent to each other in the width direction of the tire extends obliquely with respect to the width and circumferential directions of the tire; and a distance between block land portions adjacent to each other in the width direction of the tire is shorter than a distance between block land portions adjacent to each other in the circumferential direction of the tire, whereby it is possible to suppress an expansion component (FIG. 4) of a rubber caused by the contact of the block land portions adjacent to each other in the circumferential direction of the tire, while effectively being subjected to the driving force at the step-in time using reaction between the block land portions by making the most of the configuration in which the groove between the block land portions adjacent to each other in the width direction of the tire extends obliquely with respect to the width and circumferential directions of the tire and the distance between the block land portions is shorter. With this configuration, a gradient of shearing force in the circumferential direction of the tire from the step-in time to the kick-out time is made small, so that the sliding wear can be effectively reduced.

Further, a length of the block land portion in the circumferential direction of the tire falls within a range of 1.0 to 2.5% of the circumferential length of the tire, whereby it is possible to secure rigidity of the block land portion without reducing the effect obtained by the block shaped as described above, and it is possible to effectively improve the wear resistance.

Further, it is preferable that a length of the block land portion in the widthwise cross section of the tire increases from both ends of the block land portion in the circumferential direction of the tire toward a central portion of the block land portion. In this specification, the term "central portion of block land portion" represents a region extending from a central position of the block land portion in the circumferential direction of the tire toward both ends of the block land portion and having a length in a range of 5-30% of the length of the block land portion in the circumferential direction of the tire. More specifically, it represents a region excluding 20% from an end of the block land portion in the circumferential direction.

Yet further, it is preferable that a ratio of the distance between the block land portions adjacent to each other in the width direction of the tire with respect to the distance between the block land portions adjacent to each other in the circumferential direction of the tire is in a range of 1:0.85 to 1:0.3.

Yet further, it is preferable that a ratio of the distance between the block land portions adjacent to each other in the circumferential direction of the tire with respect to a length of the block land portion in the circumferential direction of the tire is in a range of 1:0.25 to 1:0.05.

Yet further, it is preferable that the block land portion is provided with a narrow groove communicating two circumferential grooves adjacent to said block land portion in the width direction of the tire.

Yet further, the narrow groove is opened to the circumferential grooves at the central portion of the block land portion.

Yet further, it is preferable that a length of the narrow groove in the tire circumferential direction is in a range of 5 to 20% of a depth of the lateral groove.

Effect Of The Invention

According to the present invention, it is possible to provide a tire possessing improved wear resistance by optimizing shapes and dimensions of a block land portion and its position and arrangement.

BEST MODE FOR CARRYING OUT THE INVENTION

Figure 5:
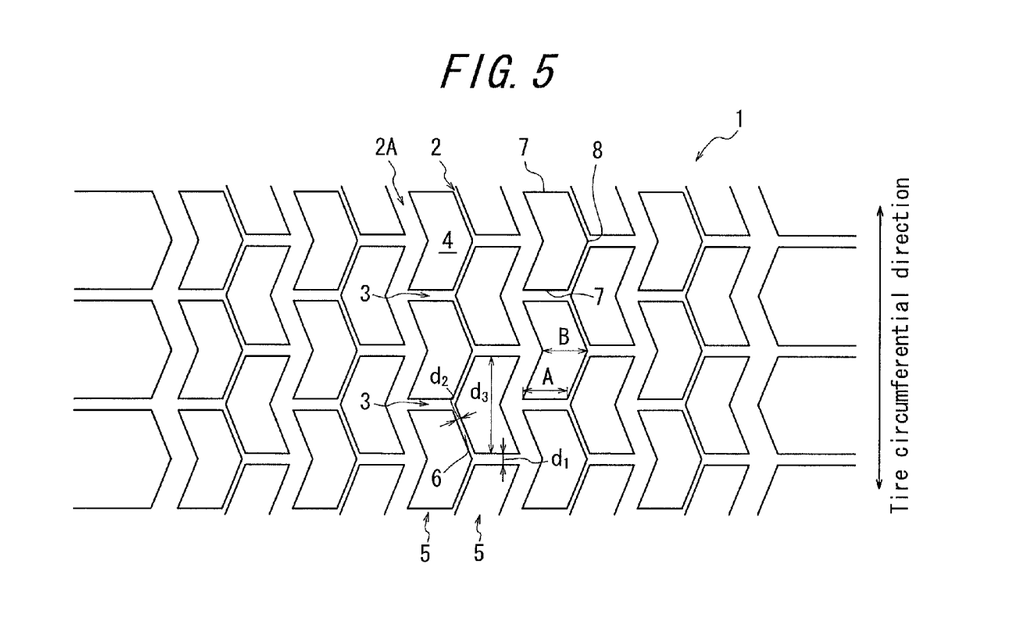
FIG. 5 is a development view illustrating a part of a tread portion of a typical tire according to the present invention.
Figure 6:
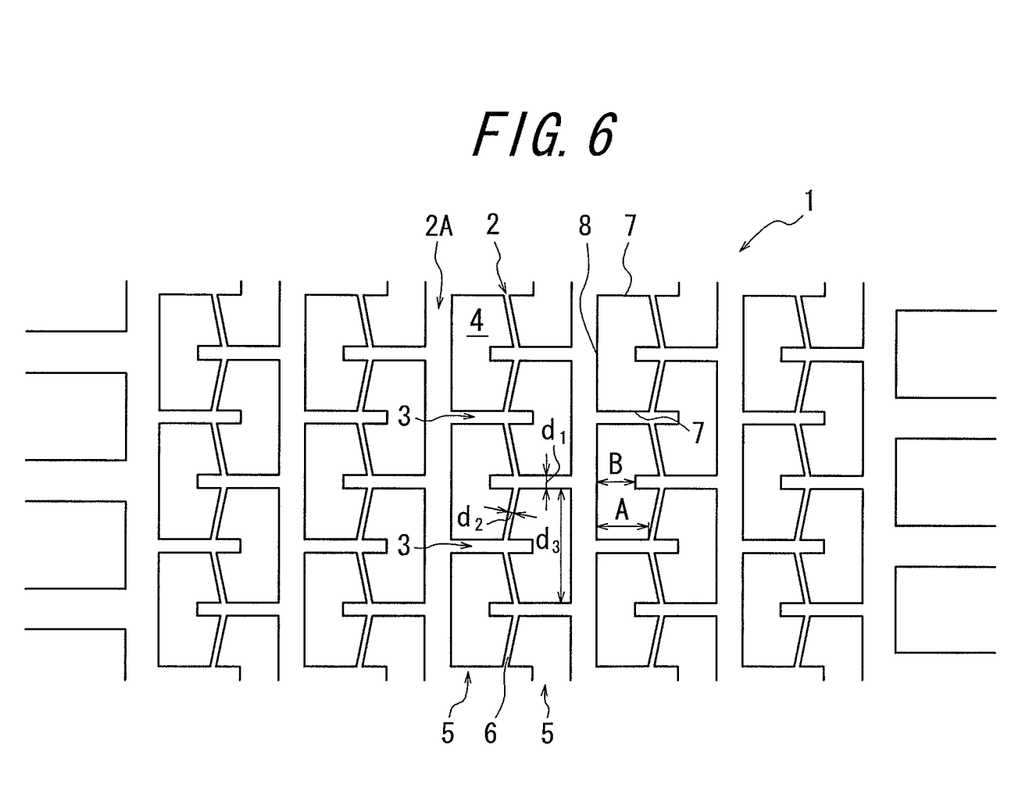
FIG. 6 is a development view illustrating a part of a tread portion of another tire according to the present invention.
Figure 7:
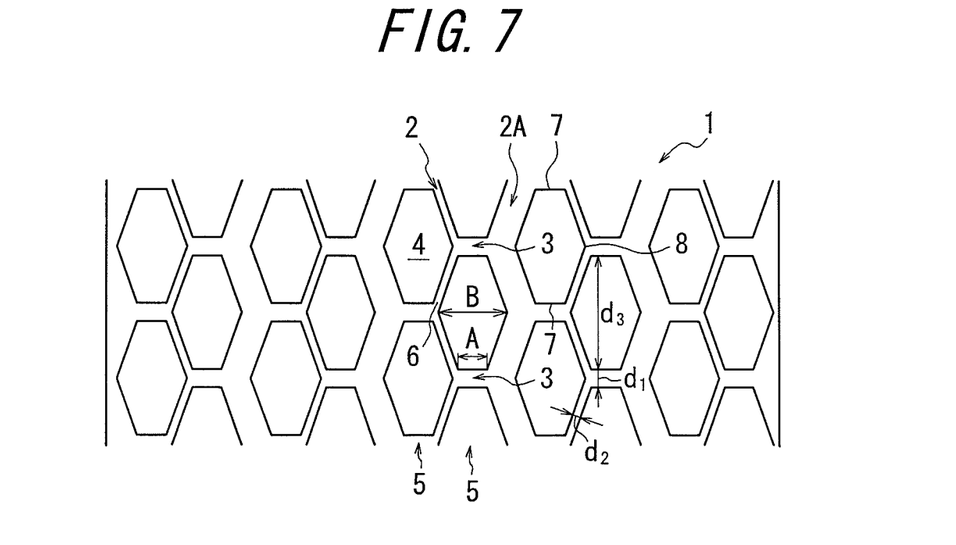
FIG. 7 is a development view illustrating a part of a tread portion of another tire according to the present invention.
Figure 8:
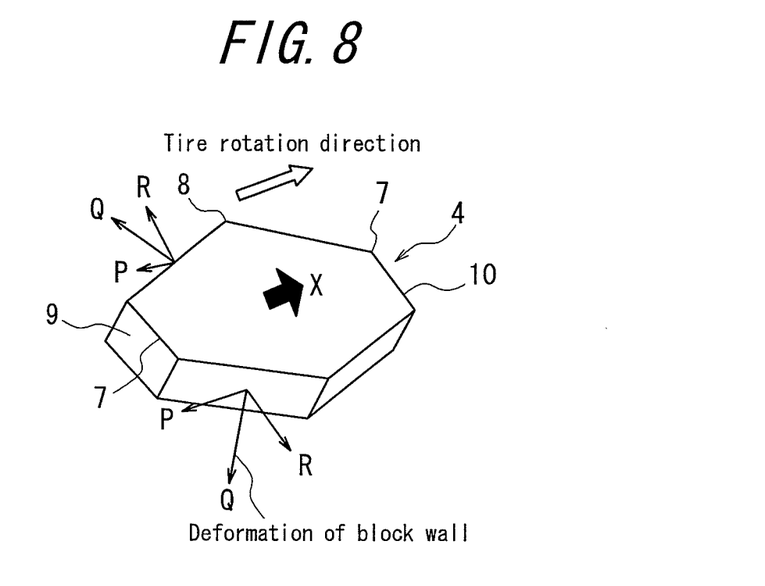
FIG. 8 is a perspective view of the block land portion illustrated in FIG. 7 (reference character X: deformation of rubber from a trailing edge to a leading edge caused by being obliquely pressed).
Figure 9:
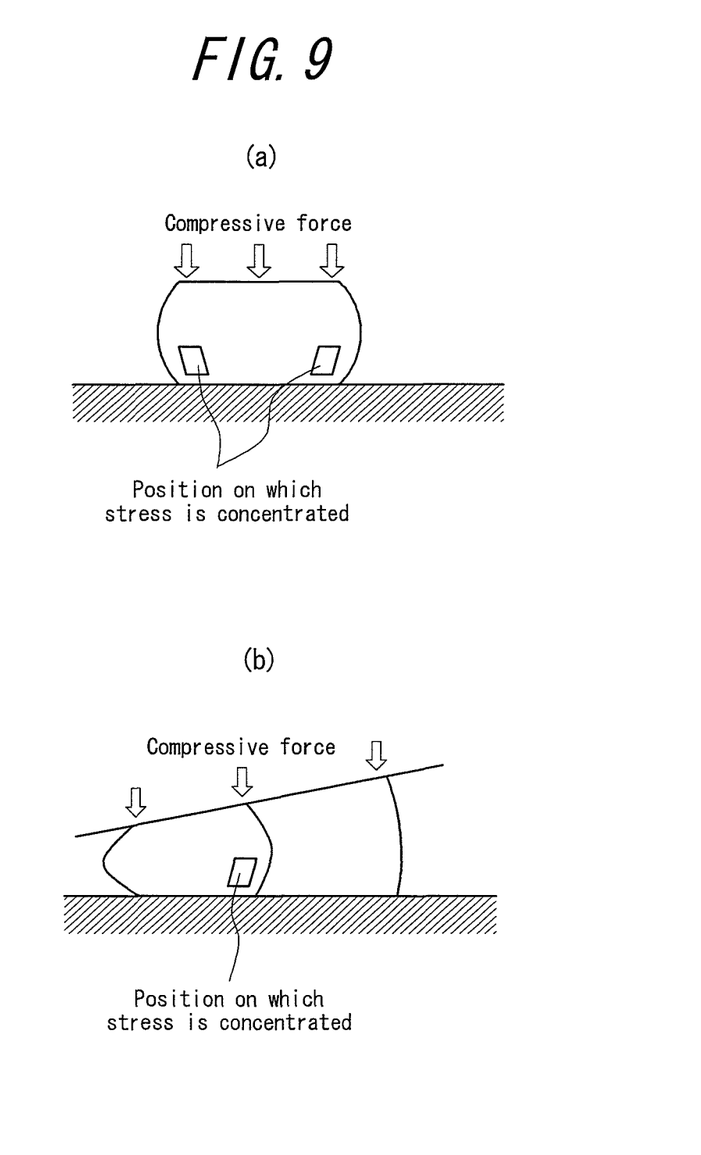
FIG. 9a is a diagram illustrating a block land portion that is pressed horizontally against a road surface and is brought into contact with the road surface.
FIG. 9b is a diagram illustrating a block land portion that is pressed obliquely against a road surface and is brought into contact with the road surface.
Figure 10:
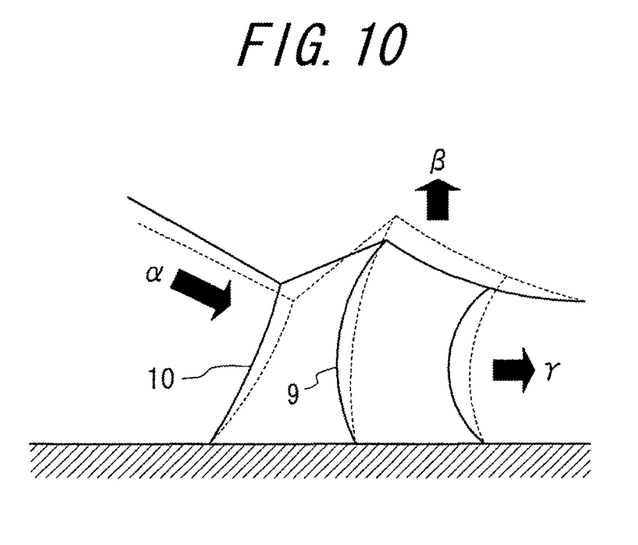
FIG. 10 is a diagram illustrating deformation of an adjacent block land portion when the driving force is applied (reference character α: shearing deformation at the step-in time increases, reference character β: degree of rise increases, reference character γ: deformation on the opposite side to the rotation direction of the tread rubber decreases).
Figure 11:
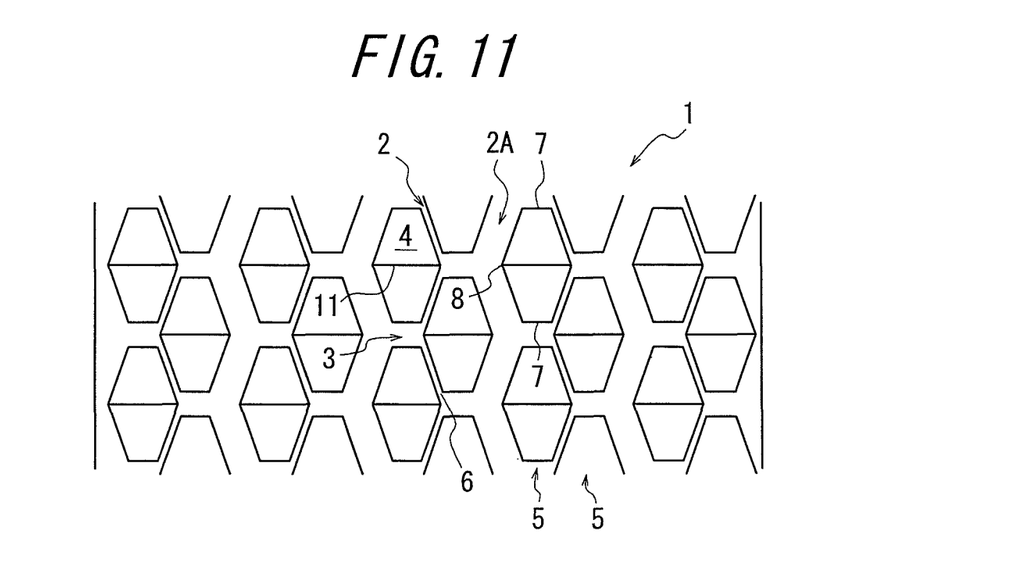
FIG. 11 is a development view illustrating a part of a tread portion of another tire according to the present invention.
Figure 12:
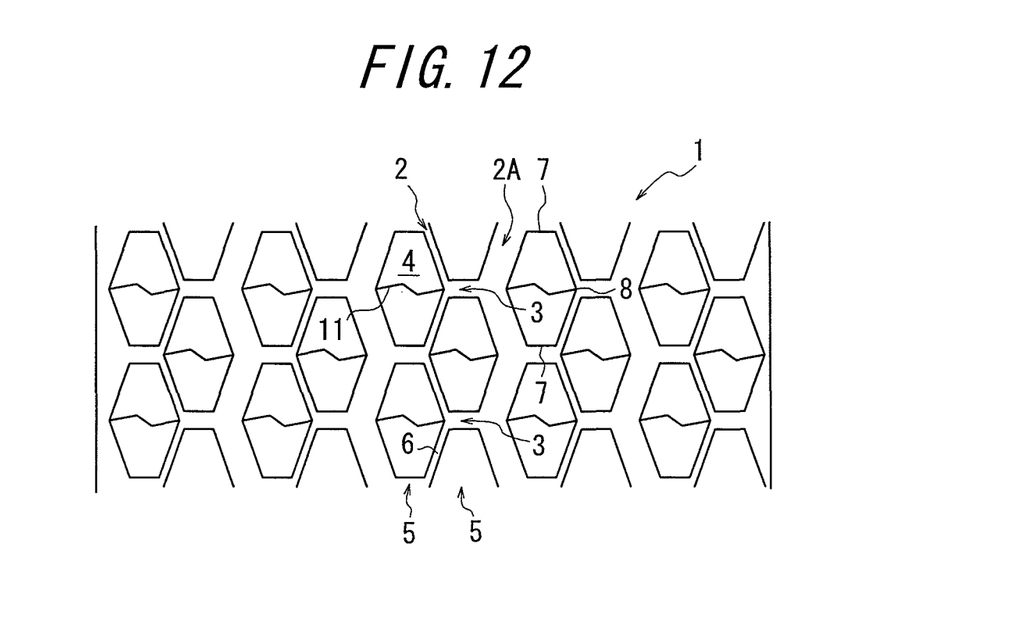
FIG. 12 is a development view illustrating a part of a tread portion of another tire according to the present invention.
Figure 13:
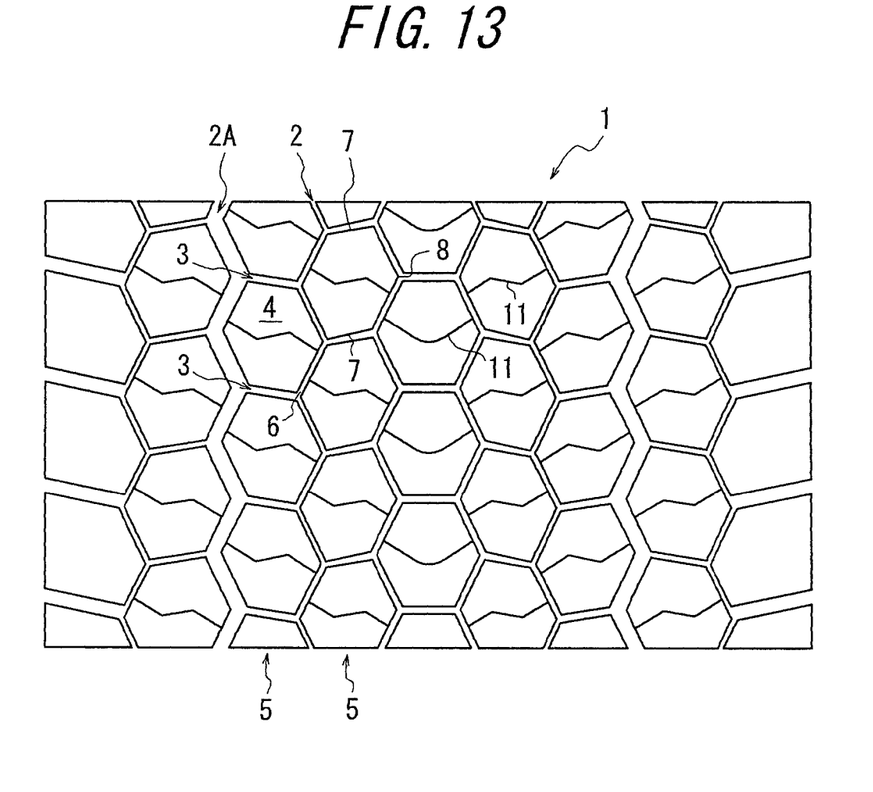
FIG. 13 is a development view illustrating a part of a tread portion of another tire according to the present invention.

Hereinbelow, embodiments of the present invention will be described with reference to the drawings. FIG. 5 is a development view of a part of a tread portion of a typical tire according to the present invention. FIGS. 6 and 7 are development views each illustrating a part of a tread portion of another tire according to the present invention. FIG. 8 is a perspective view showing a block land portion illustrated in FIG. 7. FIG. 9a is a view illustrating the block land portion that is pressed horizontally against and brought into contact with a road surface, and FIG. 9b is a view illustrating the block land portion that is pressed obliquely against and brought into contact with the road surface. FIG. 10 is a view illustrating the adjacent block land portion deformed when driving force is applied. FIGS. 11 to 13 are development views each illustrating a part of a tread tire of another tire according to the present invention.

As illustrated in FIG. 5, a tire according to the present invention has a tread portion 1 provided with plural circumferential grooves 2 extending in a circumferential direction of the tire and plural lateral grooves 3 communicating two adjacent circumferential grooves 2, 2 to demarcate plural block land portion arrays 5 formed by a large number of block land portions 4. Further, between the adjacent block land portion arrays 5, 5, the block land portions 4 constituting the block land portion array 5 are arranged so as to be positionally displaced from each other in the circumferential direction of the tire, and, a groove 6 between the block land portions adjacent to each other in the width direction of the tire extends obliquely with respect to the width direction of the tire and to the circumferential direction of the tire. Yet further, a distance $d_2$ between the block land portions adjacent to each other in the width direction of the tire is shorter than a distance $d_1$ between the block land portions adjacent to each other in the circumferential direction of the tire. Yet further, a length $d_3$ of the block land portion in the circumferential direction of the tire falls within a range of 1.0 to 2.5% of a circumferential length of the tire. At this time, the tire is configured such that: between the block land portion arrays 5, 5 adjacent to each other in the width direction of the tire, the block land portions 4 constituting the block land portion array 5 are arranged so as to be positionally displaced from each other in the circumferential direction of the tire; the groove 6 between the block land portions adjacent to each other in the width direction of the tire extends obliquely with respect to the width and circumferential directions of the tire; and the distance $d_2$ between the block land portions adjacent to each other in the width direction of the tire is shorter than the distance $d_1$ between the block land portions adjacent to each other in the circumferential direction of the tire, thereby suppressing an expansion component (FIG. 4) of a rubber caused by contact of the block land portions 4 adjacent to each other in the circumferential direction of the tire, while effectively being subjected to the driving force at the step-in time using reaction between the block land portions 4 as illustrated in FIG. 3 by making the most of the configuration in which the groove 6 between the block land portions adjacent to each other in the width direction of the tire extends obliquely with respect to the width direction of the tire and to the circumferential direction of the tire, and the distance between the block land portions is shorter. It is preferable for the block land portions 4 adjacent to each other in the width direction of the tire to be arranged so as to be positionally displaced from each other by a half pitch in the circumferential direction of the tire. This is because deformation force at the time of falling and deformation can be effectively transferred to the block land portion 4 adjacent in the width direction of the tire by positionally displacing the block land portion 4 by a half pitch, so that it is possible to reduce the driving force that the tread portion 1 applied per unit area, and the wear caused by the slippage phenomenon of the block land portion 4 with respect to the road surface can be prevented. As described above, the sliding wear can be reduced by making a gradient of shearing force in the circumferential direction of the tire from the step-in time to the kick-out time small and reducing the shearing force at the kick-out time, which is accompanied by sliding wear.

In order to obtain the effect of the block land portion 4 according to the present invention as described above, it is preferable for the length $d_3$ of the block land portion 4 in the circumferential direction of the tire to be 2.5% or lower of the circumferential length of the tire. This is because, in a case where the length $d_3$ exceeds 2.5%, the rigidity of the block against the shearing force excessively increases, which may prevent the sufficient rise of the block land portion 4 that has already been stepped in as described above. However, even in a case where the length $d_3$ of the block land portion 4 in the circumferential direction of the tire is 2.5% or lower of the circumferential length of the tire but is less than 1.0%, the rigidity of the block land portion 4 excessively decreases. In this case, the block land portion 4 is excessively sheared and deformed when the driving force is applied to the block land portion 4, which makes it impossible to sufficiently suppress the sliding wear. Therefore, the wear resistance can be improved, by setting the length $d_3$ of the block land portion 4 in the circumferential direction of the tire in a range of 1.0 to 2.5% of the circumferential length of the tire, so that the rigidity of the block land portion 4 can be secured to effectively obtain the effect made by the block land portion 4 described above.

At this time, from the viewpoint of further effectively suppressing the sliding wear, it is preferable that the groove 6 between the block land portions adjacent to each other in the width direction of the tire extends at an angle range of 15° to 70° with respect to the circumferential direction of the tire. Further, from the viewpoint of interaction between the block land portions described above and of maintaining the interaction until the end of the wear, it is preferable that a depth of the groove between the block land portions adjacent to each other in the width direction of the tire is in a range of 60 to 100% of the depth of a circumferential groove 2A. Note that the configuration of the tread portion 1 of the tire according to the present invention is not limited to the configuration illustrated in FIG. 5, and it may be possible to employ other configurations, provided that: between the two block land portion arrays 5, 5 adjacent to each other, the block land portions 4 constituting the block land portion array 5 are arranged so as to be positionally displaced from each other in the circumferential direction of the tire; the groove 6 between the block land portions adjacent to each other in the width direction of the tire extends obliquely with respect to the width direction of the tire and in the circumferential direction of the tire; and the distance $d_2$ between the block land portions adjacent to each other in the width direction of the tire is shorter than the distance $d_1$ between the block land portions adjacent to each other in the circumferential direction of the tire. For example, as illustrated in FIG. 6, it may be possible to shape the tread portion 1 of the tire such that the length of the block land portion 4 in the widthwise cross section of the tire increases from both ends 7, 7 of the block land portion 4 in the circumferential direction of the tire toward a central portion 8 of the block land portion 4, and then, decreases thereafter.

As illustrated in FIGS. 7 and 8, it is preferable for the length of the block land portion 4 in the widthwise cross section of the tire to increase from both ends 7, 7 of the block land portion 4 in the circumferential direction of the tire toward the central portion 8 of the block land portion 4. The present inventor made a keen study on a tire having the block land portion, and in particular, on the wear of the block land portion in a case where a tire for heavy load having a high aspect ratio is used as a driving wheel, and as a result, the present inventor found the followings. More specifically, if the block land portion is pressed against and is brought into contact with the road surface in a horizontal manner, a stress caused by incompressibility of rubber is concentrated on a leading edge and a trailing edge of the block land portion as shown in FIG. 9a. However, the tread portion is pressed obliquely against the road surface by the belt at the kick-out time, causing the tread wear due to slippage of the tread portion, and hence, the stress caused by the incompressibility of rubber is applied to the central portion of the block land portion as shown in FIG. 9b. In particular, in a case where the tire has a high aspect ratio and high belt rigidity, the tread portion is further strongly pressed obliquely against the road surface, and as a result, the stress caused by the incompressibility of rubber is further largely applied to the central portion of the block land portion. The force accompanied by this compression and deformation is applied in the direction same as the traveling direction of the vehicle, and is added with the driving force from the engine torque, leading to increase in the sliding wear. In view of the facts above, as described above, the length of the block land portion 4 in the widthwise cross section of the tire increases from both ends 7, 7 of the block land portion in the circumferential direction of the tire toward the central portion 8 of the block land portion 4, so that the compressive stress is concentrated on the central area of the block land portion 4 as shown in FIG. 9b when the block land portion 4 is obliquely brought into contact with the road surface. As a result, even if there occurs a force that causes the rubber at the central area of the block land portion 4 to deform from the trailing edge 9 toward the leading edge 10, a force Q occurs by which a wall portion of the block land portion 4 obliquely inclined with respect to the trailing edge side of the block land portion 4 in the tire circumferential direction expands in the direction of the normal thereto, as shown in FIG. 8. At this time, a component R of the force Q acting to expand is generated from each of the right and left wall portions of the block land portion 4, each of which acts in opposite directions, and the components R are cancelled with each other within the block land portion 4, whereby the other component P of the force Q acts against a force that causes the rubber at the central area of the block land portion to deform from the trailing edge 9 toward the leading edge 10. As a result, the excess deformation of the block land portion 4 is suppressed, and it is possible to prevent the partial wear and the sliding wear of the block land portion 4. Further, as shown in FIG. 10, comparison was made between deformation (solid line) of the block land portion in a case where the driving force is applied to the block land portion that does not have the shape described above and deformation (dashed line) thereof in a case where the driving force is applied to the block land portion 4 that has a shape and arrangement according to the present invention as described above. In the block land portion 4 according to the present invention, although deformation of the rubber toward the trailing edge side of the block is suppressed at the step-in time due to the same mechanism as that of the kick-out time, the suppressed deformation acts in a direction in which the trailing edge 9 of the block land portion 4 that has been already stepped in is made further rise, which is caused by the incompressibility of rubber. This increases the shearing deformation of the next block land portion 4 to be stepped in, thereby providing a synergistic effect as shown in FIG. 2 in which the shearing force at the step-in time increases and the shearing force at the kick-out time decreases, which has larger effect on wear. At this time, it is preferable that a ratio of a length B of the central portion 8 of the block land portion 4 in the width direction of the tire with respect to a length A of the circumferential edge portion of the block land portion 4 in the width direction of the tire falls within a range of 1:3 to 1:1.5. This is because, if the ratio of the length falls outside the range, the deformation of the block land portion 4 cannot be effectively prevented in such a case that the block land portion 4 is obliquely brought into contact with the road surface, possibly causing the partial wear and the sliding wear of the block land portion.

Further, at this time, it is preferable that the grooves 6 between the block land portions 4 adjacent to each other in the tire width direction, which face a certain block land portion 4 and constitute the same circumferential groove 2, are inclined in the opposite directions with each other with respect to the tire equatorial plane as view from the tire circumferential direction. This is because, in a case where the groove 6 between the block land portions adjacent to each other in the tire width direction extends in one direction, it is possible to effectively deal with an input from a certain direction to prevent the sliding wear, but may not be possible to effectively deal with an input from other direction to prevent the sliding wear. Further, the tire is configured such that slopes of the grooves adjacent in the width direction of the tire, and slopes of the block land portion 4 shaped such that the length of the central portion of the block land portion 4 in the tire width direction increases, are arranged so as to be made faced with each other, whereby it is possible to form a block pattern without generating wasted spaces in the tire width direction, while effectively achieving the wear resistance performance without deteriorating both of the configurations and effects, so that it becomes easy to design a pattern by combining with a second rib, a shoulder rib, a lug and the like.

Further, a ratio of the distance $d_1$ between the block land portions adjacent to each other in the circumferential direction of the tire with respect to the distance $d_2$ between the block land portions adjacent to each other in the width direction of the tire width falls preferably within a range of 1:0.85 to 1:0.3, and more preferably, within a range of 1:0.7 to 1:0.4. In a case where the ratio of the distance $d_1$ between the block land portions adjacent to each other in the circumferential direction of the tire with respect to the distance $d_2$ between the block land portions adjacent to each other in the width direction of the tire width is larger than 1:0.3, the distance $d_2$ between the block land portions adjacent to each other in the width direction of the tire is too short even if the distance $d_1$ between the block land portions adjacent to each other in the circumferential direction of the tire is sufficient. For this reason, the adjacent block land portions 4 in the tire width direction are brought into contact with each other at the time of rotation of tire under load, and the deformation force generated from falling and deformation is not effectively transferred to the block land portion 4 adjacent in the tire width direction, whereby the shearing force within the block land portion 4 is not effectively distributed, possibly causing the sliding wear. On the other hand, in a case where the ratio of the distance $d_1$ between the block land portions adjacent to each other in the circumferential direction of the tire with respect to the distance $d_2$ between the block land portions adjacent to each other in the width direction of the tire width is smaller than 1:0.85, the distance $d_1$ between the block land portions adjacent to each other in the circumferential direction of the tire is too short even if the distance $d_2$ between the block land portions adjacent to each other in the width direction of the tire is sufficient. For the reason described above, when the block land portion 4 is brought into contact with the road surface, the block land portions 4 come into contact with each other in the tire circumferential direction, and the rubber expands and deforms as illustrated in FIG. 4, possibly reducing the wear resistance performance.

Further, a ratio of the length $d_3$ of the block land portion 4 in the circumferential direction of the tire with respect to the distance $d_1$ between the block land portions adjacent to each other in the circumferential direction of the tire falls preferably within a range of 1:0.25 to 1:0.05, more preferably, within a range of 1:0.17 to 1:0.07. In a case where the ratio of the length $d_3$ of the block land portion 4 in the circumferential direction of the tire with respect to the distance $d_1$ between the block land portions adjacent to each other in the circumferential direction of the tire is larger than 1:0.05, the block land portions adjacent to each other in the tire circumferential direction are made too close to each other when the block land portion 4 falls and deforms at the time of rotation of tire under load. For this reason, as illustrated in FIG. 4, when the block land portion 4 of the tread portion that is in contact with the road surface is pressed and deformed, the block land portions 4 adjacent to each other in the tire circumferential direction come into contact with each other at the central portion of the tread portion 1, and the block land portion 4 on the outer side is pushed out toward the outer side of the tire circumferential direction, so that the block land portion 4 excessively falls and deforms toward both directions of the tire rotation direction and the opposite direction to the tire rotation direction. This increases forces at the trailing edge 9 acting in the direction where the driving force is applied, possibly causing the sliding wear resulting from the falling and deformation described above. On the other hand, in a case where the ratio of the length $d_3$ of the block land portion 4 in the circumferential direction of the tire with respect to the distance $d_1$ between the block land portions adjacent to each other in the circumferential of the tire is smaller than 1:0.25, the block land portions 4 adjacent to each other in the tire circumferential direction are excessively separated away from each other. Therefore, the shearing force of the block land portions adjacent to each other in the tire circumferential direction cannot be distributed in a balanced manner by utilizing the shearing force at the trailing edge 9 of the block land portion 4, also possibly causing the sliding wear.

Yet further, the distance $d_2$ between the block land portions adjacent to each other in the width direction of the tire falls preferably within a range of 1.0 to 5.0 mm, and more preferably within a range of 1.5 to 3.5 mm. In a case where the distance $d_2$ between the block land portions adjacent to each other in the width direction of the tire exceeds 5.0 mm, the distance $d_2$ between the block land portions adjacent to each other in the width direction of the tire is too long. Therefore, the deformation force generated from falling and deformation cannot be transferred to the block land portion 4 adjacent in the tire width direction, causing excessive falling and deformation in the tire circumferential direction, and possibly causing the wear resulting from the sliding of the block land portion 4. On the other hand, in a case where the distance $d_2$ between the block land portions adjacent to each other in the width direction of the tire is less than 1.0 mm, the distance $d_2$ between the block land portions adjacent to each other in the width direction of the tire is too short. Therefore, the block land portions 4 adjacent in the tire width direction are brought into contact with each other at the time of rotation of tire under load, and the deformation force generated from falling and deformation is not effectively transferred to the block land portion 4 adjacent in the tire width direction, causing excessive falling and deformation, and also possibly causing the wear resulting from the sliding of the block land portion 4.

Further, the distance $d_1$ between the block land portions adjacent to each other in the circumferential direction of the tire falls preferably within a range of 3.0 to 10.0 mm, and more preferably within a range of 4.0 to 8.0 mm. In a case where the distance $d_1$ between the block land portions adjacent to each other in the circumferential direction of the tire exceeds 10.0 mm, the distance $d_1$ between the block land portions adjacent to each other in the circumferential direction of the tire is too long. Therefore, the contacting pressure of the block land portion 4 excessively increases, possibly deteriorating the wear resistance performance. On the other hand, in a case where the distance $d_1$ between the block land portions adjacent to each other in the circumferential direction of the tire is less than 3.0 mm, the distance $d_1$ between the block land portions adjacent to each other in the circumferential direction of the tire is too short. Therefore, the block land portions 4 are brought into contact with each other in the tire circumferential direction when brought into contact with the road surface, generating the deformation due to the expansion of the rubber as illustrated in FIG. 4, possibly deteriorating the wear resistance performance.

Further, as illustrated in FIGS. 11 to 13, it is preferable that the block land portion 4 is provided with a narrow groove 11 communicating, in the tire width direction, two circumferential grooves 2, 2 adjacent to said block land portion 4. By forming the trailing edge 9 again as described above, a grip force of the block land portion 4 can be generally improved, so that the torque from an engine can be effectively transferred into the driving force. Note that, at this time, the narrow groove 11 may curve or bend within the block land portion 4.

Further, it is preferable that the narrow groove 11 is opened to the circumferential grooves 2 at the central portion 8 of the block land portion 4. This is because, in a case where the narrow groove 11 is opened at the region other than the central portion 8 of the block land portion 4, the grip force used for the driving force cannot be distributed in the block land portion 4 in a balanced manner, possibly unable to effectively transfer the torque from the engine into the driving force.

Further, the length of the narrow groove 11 in the tire circumferential direction falls preferably within a range of 5 to 20% of a depth (depth in the radial direction) of the lateral groove 3, more preferably within a range of 7 to 18%. In a case where the length of the narrow groove 11 in the tire circumferential direction is less than 5% of the depth of the lateral groove 3, the length of the narrow groove 11 in the tire circumferential direction is too short. As a result, similar to the case where the narrow groove 11 is not provided in the block land portion 4, the grip force decreases from the leading edge 10 toward the trailing edge 9, possibly eliminating the effect obtained by forming the narrow groove 11. On the other hand, in a case where the length of the narrow groove 11 in the tire circumferential direction exceeds 20% of the depth of the lateral groove 3, the length of the narrow groove 11 in the tire circumferential direction is too long. As a result, the force resulting from the reaction between the block land portions 4, which have been divided by the narrow groove 11 within a block land portion 4, cannot be transferred, causing the excess falling and deformation and possibly causing the sliding wear resulting from the excess falling and deformation. Further, in order to maintain the sufficient effect until the end of the wear, it is preferable for the depth of the narrow groove 11 to be in a range of 60 to 100% of the depth of the lateral groove 3.

It should be noted that what has been described above exemplifies merely a part of the embodiment of the present invention and it is possible to combine these configurations with each other or apply various modifications thereto without departing from the spirit of the present invention. For example, in the tires having configurations illustrated in FIGS. 5 to 7, 11 and 12, the effect of preventing the partial wear according to the present invention can be achieved by forming one unit from two block land portion array 5, and arranging the plural units on the surface of the tread portion. However, it may be possible to forming one unit from three or more block land portion arrays 5, and also forming one unit from five arrays as illustrated in FIG. 13. Further, the tire illustrated in FIG. 13 is a tire whose mounting direction is designated for use. However, even if a tire, whose mounting direction of a tire is designated is mounted opposite to the designated mounting direction, the effect according to the present invention can be sufficiently obtained, provided that the configurations according to the present invention as described above is satisfied.

EXAMPLES

Pneumatic tires according to the present invention (Example tires 1-7); a pneumatic tire (Conventional Example tire) having a conventional tread pattern; and pneumatic tires (Comparative Example tires 1, 2) having configurations similar to the pneumatic tire according to the present invention except that the ratio of the length of the block land portion in the tire circumferential direction with respect to the circumferential length of the tires falls outside the range specified in the present invention, each for heavy load with tire size of 495/45R22.5 are prepared and their performance are evaluated as will be described below.

Each of Example tires 1-7 is a pneumatic tire provided with a tread portion configured as shown in Table 1 and having block land portions on the entire tread portion thereof. Further, between the adjacent block land portion arrays, the block land portions constituting the block land portion arrays are arranged so as to be positionally displaced by a half pitch from each other in the circumferential direction of the tire. Yet further, the groove between the block land portions adjacent to each other in the width direction of the tire extends obliquely with respect to the circumferential direction of the tire, and the distance between the block land portions adjacent to each other in the width direction of the tire is shorter than the distance between the block land portions adjacent to each other in the circumferential direction of the tire. Still yet further, the length of the block land portion in the circumferential direction of the tire falls within a range of 1.0 to 2.5% of the circumferential length of the tire.

TABLE 1

|  | Example tire 1 | Example tire 2 | Example tire 3 | Example tire 4 | Example tire 5 | Example tire 6 | Example tire 7 |
| --- | --- | --- | --- | --- | --- | --- | --- |
| Corresponding drawing | FIG. 6 | FIG. 7 | FIG. 11 | FIG. 12 | FIG. 13 | Not available | Not available |
| Tire circumferential length | 3200 mm | 3200 mm | 3200 mm | 3200 mm | 3200 mm | 3200 mm | 3200 mm |
| Length of block land portion in tire circumferential direction | 60.0 mm | 60.0 mm | 60.0 mm | 60.0 mm | 60.0 mm | 32.0 mm | 80.0 mm |
| Ratio of length of block land portion in circumferential direction with respect to tire circumferential length | 1.90% | 1.90% | 1.90% | 1.90% | 1.90% | 1.00% | 2.50% |
| Length of circumferential end of block land portion in tire width direction | 27.0 mm | 27.0 mm | 16.0 mm | 16.0 mm | 30.0 mm | 27.0 mm | 27.0 mm |
| Length of central portion of block land portion in tire width direction | 20.0 mm | 38.0 mm | 38.0 mm | 38.0 mm | 61.0 mm | 20.0 mm | 51.0 mm |

TABLE 1-continued

|  | Example tire 1 | Example tire 2 | Example tire 3 | Example tire 4 | Example tire 5 | Example tire 6 | Example tire 7 |
|---|---|---|---|---|---|---|---|
| Depth of lateral groove | 18.0 mm | 18.0 mm | 18.0 mm | 18.0 mm | 18.0 mm | 18.0 mm | 18.0 mm |
| Distance between block land portions adjacent in tire width direction | 3.0 mm | 3.0 mm | 3.0 mm | 3.0 mm | 1.8 mm | 3.0 mm | 3.0 mm |
| Depth of groove between block land portions adjacent in tire width direction | 15.0 mm | 15.0 mm | 15.0 mm | 15.0 mm | 15.0 mm | 15.0 mm | 15.0 mm |
| Distance between block land portions adjacent in tire circumferential direction | 7.0 mm | 7.0 mm | 7.0 mm | 7.0 mm | 4.0 mm | 7.0 mm | 7.0 mm |
| Angle of groove between block land portions adjacent in tire width direction with respect to tire circumferential direction | 20°/0° | 20°/−20° | 20°/−20° | 20°/−20° | 20°/−27° | 20°/−20° | 20°/−20° |
| Presence or absence of narrow groove | Absence | Absence | Presence | Presence | Presence | Absence | Absence |
| Width of narrow groove | — | — | 1.0 mm | 1.0 mm | 1.0 mm | — | — |
| Depth of narrow groove | — | — | 15.0 mm | 15.0 mm | 15.0 mm | — | — |
| Presence or absence of bend of narrow groove | — | — | Absence | Presence | Presence | — | — |
| Number of block land portions adjacent in tire width direction | 2 | 2 | 2 | 2 | 5 | 2 | 2 |

Figure 14:
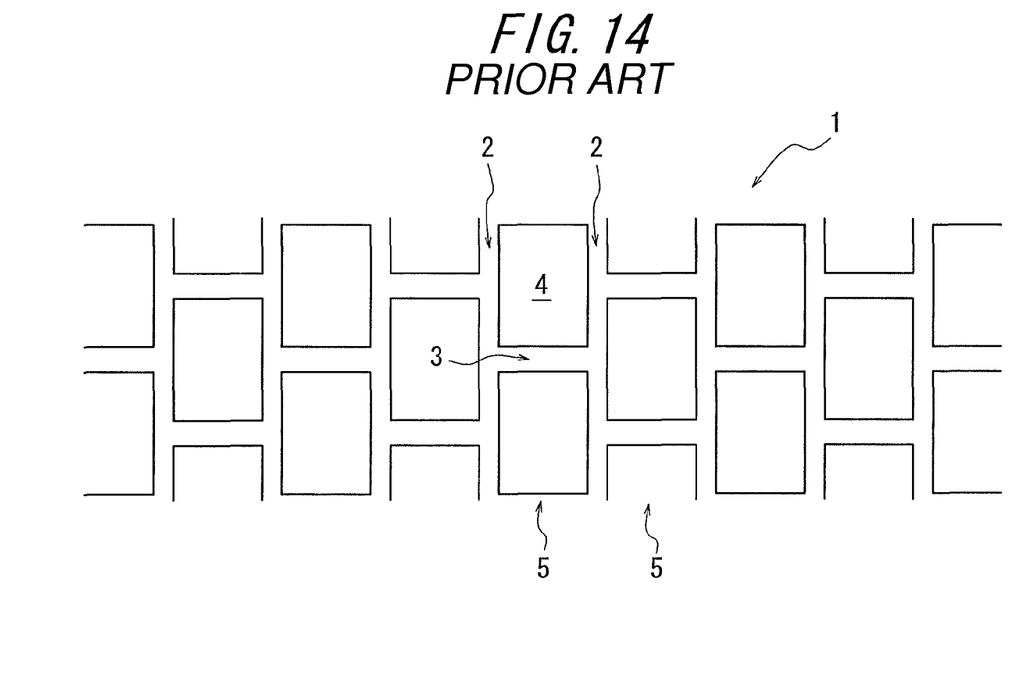
FIG. 14 is a development view illustrating a part of a tread portion of a Conventional Example tire.

Conventional Example tire is provided with block land portions having a quadrangle shape illustrated in FIG. 14, and has the characteristics shown in Table 2. Comparative Example tires 1, 2 are configured such that, between the adjacent block land portion arrays, the block land portions constituting the block land portion arrays are arranged so as to be positionally displaced by a half pitch from each other in the circumferential direction of the tire; the distance between the block land portions adjacent to each other in the width direction of the tire is longer than the distance between the block land portions adjacent to each other in the circumferential direction of the tire; and the ratio of the length of the block land portion in the tire circumferential direction with respect to the circumferential length of the tires falls outside the range specified in the present invention, and have the characteristics shown in Table 2.

TABLE 2

|  | Conventional Example tire | Comparative Example tire 1 | Comparative Example tire 2 |
|---|---|---|---|
| Corresponding drawing | FIG. 14 | Not available | Not available |
| Tire circumferential length | 3200 mm | 3200 mm | 3200 mm |
| Length of block land portion in tire circumferential direction | 60.0 mm | 25.0 mm | 90.0 mm |
| Ratio of length of block land portion in circumferential direction with respect to tire circumferential length | 1.90% | 0.70% | 2.80% |
| Length of circumferential end of block land portion in tire width direction | 40.0 mm | 7.0 mm | 24.0 mm |
| Length of central portion of block land portion in tire width direction | 40.0 mm | 16.0 mm | 57.0 mm |
| Depth of lateral groove | 18.0 mm | 18.0 mm | 18.0 mm |
| Distance between block land portions adjacent in tire width direction | 3.0 mm | 3.0 mm | 3.0 mm |
| Depth of groove between block land portions adjacent in tire width direction | 15.0 mm | 15.0 mm | 15.0 mm |
| Distance between block land portions adjacent in tire circumferential direction | 7.0 mm | 7.0 mm | 7.0 mm |
| Angle of groove between block land portions adjacent in tire width direction with respect to tire circumferential direction | 0°/0° | 20°/−20° | 20°/−20° |
| Presence or absence of narrow groove | Absence | Absence | Absence |
| Width of narrow groove | — | — | — |
| Depth of narrow groove | — | — | — |
| Presence or absence of bend of narrow groove | — | — | — |
| Number of block land portions adjacent in tire width direction | — | 2 | 2 |

Each of the prepared tires is assembled with a rim having a size of 17.00×22.5 to form a tire wheel, attached to a driving wheel of a tractor vehicle for use in the test and inflated at an air pressure of 900 kPa (relative pressure). Tire load mass of 57 kN is applied to each of the tires, and an amount of wear is measured at the central portion of the block land portion after a run of 50000 km on a test road. The wear resistance performance is shown as index values by setting the amount of wear (depth) of Conventional Example tire at the central portion of the block land portion to be the maximum value of 100. For other tires, the relative values are obtained, and evaluation is made by comparing those values. Note that the smaller index value represents the better wear resistance performances. The results thereof are shown in Table 3.

TABLE 3

| | Corresponding drawing | Amount of wear at central portion of block land portion |
|---|---|---|
| Conventional Example tire | FIG. 14 | 100 |
| Comparative Example tire 1 | Not available | 87 |
| Comparative Example tire 2 | Not available | 85 |
| Example 1 | FIG. 6 | 80 |
| Example 2 | FIG. 7 | 76 |
| Example 3 | FIG. 11 | 71 |
| Example 4 | FIG. 12 | 74 |
| Example 5 | FIG. 13 | 67 |
| Example 6 | Not available | 78 |
| Example 7 | Not available | 78 |

From the results in Table 3, it is known that Example tires 1-7 can reduce the amount of wear at the center of the tread portion and improve the wear resistance as compared with any of Conventional Example tire and Comparative Example tires 1, 2 because of optimization in Example tires 1-7 in terms of the distance between the block land portions adjacent to each other in the circumferential direction of the tire and in the width direction of the tire, and the length of the block land portion in the circumferential direction of the tire. Of the samples, as for Example tires 2-7, shapes of the block land portions are also optimized, and hence, those tires further reduces the amount of wear and significantly improves the wear resistance. As for Example tires 3-5, as narrow grooves are further provided in the block land portion thereof, those tires exhibit the improved grip performance, and improve the wear resistance as compared with Example tires 2, 6 and 7.

INDUSTRIAL APPLICABILITY

As can be clearly understood from the description above, according to the present invention, it is possible to provide a tire possessing improved wear resistance by optimizing shapes and dimensions of a block land portion and its position and arrangement.

DESCRIPTION OF REFERENCE NUMERALS

1 Tread portion
2 Circumferential groove
3 Lateral groove
4 Block land portion
5 Block land portion array
6 Groove between block land portions adjacent to each other in the width direction of the tire
7 End of the block land portion in the circumferential direction of the tire
8 Central portion of the block land portion
9 Trailing edge
10 Leading edge
11 Narrow groove

The invention claimed is:

1. A tire having a tread portion provided with a plurality of circumferential grooves extending in a circumferential direction of the tire and a plurality of lateral grooves communicating two adjacent circumferential grooves to define a plurality of block land portion arrays formed by a large number of block land portions, wherein
between the block land portion arrays located adjacent to each other across the circumferential groove, the block land portions constituting the block land portion arrays are arranged so as to be positionally displaced from each other in the tire circumferential direction;
a groove between the block land portions adjacent to each other in a width direction of the tire extends obliquely with respect to the width direction of the tire and to the circumferential direction of the tire;
a distance between the block land portions adjacent to each other in the width direction of the tire is shorter than a distance between the block land portions adjacent to each other in the circumferential direction of the tire; and,
a length of the block land portion in the circumferential direction of the tire falls within a range of 1.0 to 2.5% of a circumferential length of the tire;
a ratio of the distance between the block land portions adjacent to each other in the circumferential direction of the tire with respect to the distance between the block land portions adjacent to each other in the width direction of the tire is in a range of 1:0.7 to 1:0.4; and
each of the land block portions has a hexagonal shape;
wherein the groove between the block land portions adjacent to each other in a width direction of the tire extends at an angle range of 35° to 70° with respect to the circumferential direction of the tire.

2. The tire according to claim 1, wherein
a length of the block land portion in a widthwise cross section of the tire increases from both ends of the block land portion in the circumferential direction of the tire toward a central portion of the block land portion.

3. The tire according to claim 1, wherein
a ratio of a length of the block land portion in the circumferential direction of the tire with respect to the distance between the block land portions adjacent to each other in the circumferential direction of the tire is in a range of 1:0.17 to 1:0.05.

4. The tire according to claim 1, wherein
the block land portion is provided with a narrow groove communicating two circumferential grooves adjacent to said block land portion in the width direction of the tire.

5. The tire according to claim 4, wherein
the narrow groove is opened to the circumferential grooves at the central portion of the block land portion.

6. The tire according to claim 4, wherein
a length of the narrow groove in the tire circumferential direction falls within a range of 5 to 20% of a depth of the lateral groove.

7. The tire according to claim 3, wherein
the ratio of the length of the block land portion in the circumferential direction of the tire with respect to the distance between the block land portions adjacent to each other in the circumferential direction of the tire is in a range of 1:0.17 to 1:0.07.

* * * * *